July 25, 1939.  J. V. MOHLER  2,167,050
AIRCRAFT PROPELLER
Filed Feb. 18, 1937
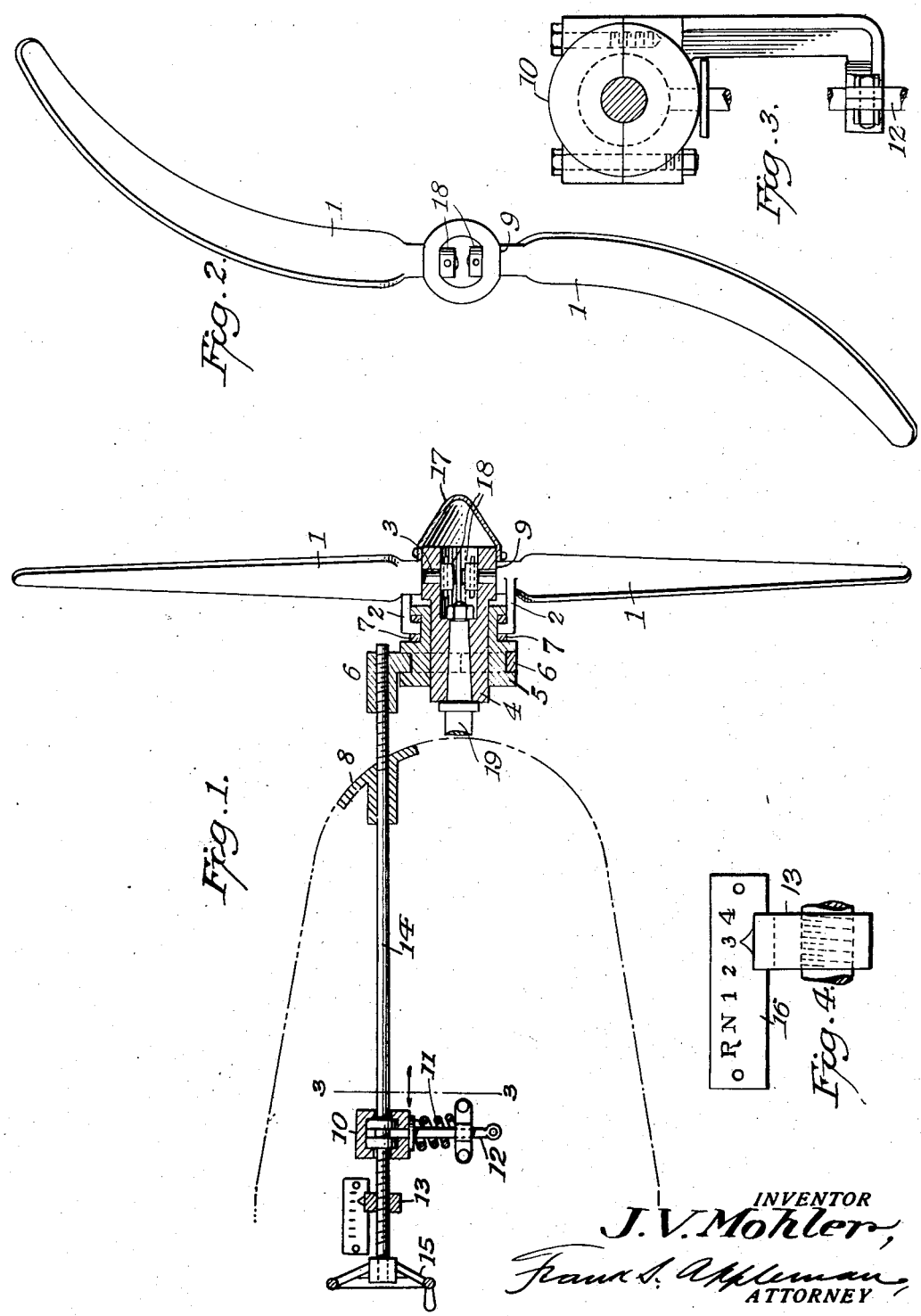
INVENTOR
J. V. Mohler,
ATTORNEY Patented July 25, 1939

2,167,050

UNITED STATES PATENT OFFICE 2,167,050

AIRCRAFT PROPELLER

James V. Mohler, Oelwein, Iowa, assignor of seventeen and five-tenths per cent to Hyman Levy, Oelwein, Iowa, seventeen and five-tenths per cent to Milford E. McClain, seven and five-tenths per cent to Weston E. Jones, and seven and five-tenths per cent to Glenn W. Till, all of Charles City, Iowa Application February 18, 1937, Serial No. 126,494

1 Claim. (Cl. 170—163)

My present invention relates to propellers and controlling mechanism for aircraft, an object being to permit control of the propeller pitch in flight by an aviator from a position considerably removed from the nose of the fuselage.

The propeller is of a contour for slicing or cutting the air, instead of beating the air in the usual manner, to reduce or entirely eliminate the noise produced by the air beating propeller.

In operation, when the controlling or adjusting mechanism is in a fully advanced position, it causes the propeller blades to turn, that it, the tips of the blades will turn in from a vertical plane for increasing the bite or power of the propeller and when the blades are in this position, the air will be thrown back and out, instead of "piling up" in front of the fuselage as the straight blade propeller does, and a large part of the slip stream will be outside of said fuselage.

In the use of the improved adjusting mechanism, the propeller here shown and described can be reversed so as to reverse the thrust; hence, when approaching at high speed for landing, the aircraft can be landed at greatly retarded speed, thus eliminating the danger of nosing over and crashing.

Another feature present is the fact that the aircraft, equipped as above described, may take off or land in a much smaller space or area than that required by the usual aircraft with its flat propeller.

A further feature is that the backward thrust of my propeller is a positive brake, far more efficient and safe than brakes on landing wheels, as the retarding force is above the center of gravity and not below it like the wheel brake.

As the shape and adjustment of my propeller blades have more power than the straight or radial blades, they may be much shorter for a determined power. This will allow landing gear to be built nearer to the horizontal line of the plane, thus lowering the center of gravity as another advantage.

With the foregoing and other objects in view, the invention consists in the details of construction, and in the arrangement and combination of parts to be hereinafter more fully set forth and claimed.

In describing the invention in detail, reference will be had to the accompanying drawing forming part of this application, wherein like characters denote corresponding parts in the several views, and in which—

Figure 1 is a sectional plan view of a propeller constructed according to my invention, and the coacting adjusting or controlling mechanism;

Figure 2 is a side elevation of the propeller blade;

Figure 3 is an enlarged detail taken on the line 3—3 of Fig. 1, and

Figure 4 is a plan view of an index employed.

The construction of the propeller adjusting mechanism may be described as follows:

The propeller blades 1 are shown in Fig. 2 as curved in a direction away from the line of rotation and these blades are provided with crank arms 2 and trunnions 3 operable or rockable in a trunnion block 4, which is rectangular or square in cross section and has a close sliding fit in a collar bearing 5, together with a tapered bore to receive, in locked relation, the power or engine shaft 19.

A collar 6 fits into the collar bearing 5 and has a threaded bearing at one side for receiving a threaded end portion of an adjusting shaft 14, provided with a hand wheel 15 for sliding member 5 on member 4.

Trunnions are provided on the free ends of arms 2 and on each trunnion is fitted a roller 7 which slides in a suitable groove in the member 5.

10 designates a shaft bearing and lock for adjusting shaft 14 to be attached to any portion of the fuselage, part 10 being in two pieces bolted together as shown in Fig. 4.

A lock rod 12 passes through a compressed spring 11 to lock the rod into one of a series of holes 12a in a boss 12b rotatable in the bearing 10, as shown in Fig. 1, and at the end of the lock rod, I supply means whereby a connection may be made to a foot pedal (not shown) to permit locking and unlocking the mechanism without using the hands.

In Fig. 4 a threaded block 13 is operated by threads on the shaft 14 and which moves at the same speed and distance that the collar 6 moves on shaft 14. While the threads between shaft 14 and collar 6 are self locking, the arrangement of the locking device prevents collar 6 from creeping on shaft 14.

8 is a bearing for the shaft 14. The threaded block 13 is an index and operates in conjunction with an index plate 16 having appropriate letters and numerals stamped thereon to enable the pilot to tell at a glance just what the positions of the propeller blades are being used with reference to pitch. The index plate 16 is marked in numerals for forward speed, "N" for neutral and "R" for reverse.

When landing, especially from high speeds, the pilot will retard to nearly neutral "N" and upon touching the ground, he will bring the indicator to reverse "R", resulting in a safe stop of the aircraft in a very small area or space.

At the forward end of the trunnion bearing or block 4 is attached a conical cap 17 to exclude dust and dirt, and nuts 18 are pinned to the ends of the trunnions 3.

Although I have shown and described certain specific embodiments of my invention, I am fully aware that many modifications thereof are possible. My invention, therefore, is not to be restricted except in so far as is necessitated by the prior art and by the spirit of the appended claim.

I claim:

In a variable pitch propeller device, a hub having a rear portion of cylindrical exterior form and having an axial bore extending forwardly from its rear end and taperingly contracted from rear to front, said hub having a forward portion of generally cylindrical form exteriorly and having diametrically disposed flat portions, said hub having a forward recess conforming in shape to the exterior of the forward hub portion, the rear end of said recess having the bore opening thereinto and forming a shoulder around the opening, a drive shaft having its forward end fitting in said bore and projecting into said recess, a nut on the projecting end seated on said shoulder, said hub having openings extending radially through the flattened portions, a pair of blades having shanks fitting rotatably in said last openings and projecting into the recess, nuts on said shanks in said recess, said forward and rear portions of the hub having a rearwardly facing stop shoulder at their junction, a sleeve slidably mounted on the rear portion of the hub, said sleeve having a peripheral groove adjacent its forward end, arms each fixed on a blade and projecting over the front of the sleeve, each arm having a trunnion on its free end extending into said groove, rollers on said trunnions, a second groove extending peripherally around said sleeve, and shifting means engaging in said second groove.

JAMES V. MOHLER.